US009697621B2

(12) United States Patent
Palandri et al.

(10) Patent No.: US 9,697,621 B2
(45) Date of Patent: Jul. 4, 2017

(54) UNWRAPPING 3D MESHES INTO LOW-DISTORTION TEXTURE MAPS

(71) Applicant: Apple Inc., Cupertino, CA (US)

(72) Inventors: Remi Palandri, Cupertino, CA (US); Domenico P. Porcino, Novato, CA (US); Jacques P. Gasselin de Richebourg, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 22 days.

(21) Appl. No.: 14/732,741

(22) Filed: Jun. 7, 2015

(65) Prior Publication Data

US 2016/0358344 A1    Dec. 8, 2016

(51) Int. Cl.
| | |
|---|---|
| *G06T 17/00* | (2006.01) |
| *G06T 11/00* | (2006.01) |
| *G06T 15/04* | (2011.01) |
| *G06T 17/10* | (2006.01) |
| *G06T 19/00* | (2011.01) |

(52) U.S. Cl.
CPC ............ *G06T 11/001* (2013.01); *G06T 15/04* (2013.01); *G06T 17/10* (2013.01); *G06T 19/00* (2013.01); *G06T 2219/021* (2013.01)

(58) Field of Classification Search
CPC ................................ G06T 17/20; G06T 19/00
USPC ........................................................ 345/420
See application file for complete search history.

(56) References Cited

U.S. PATENT DOCUMENTS 6,313,838 B1    11/2001   Deering
6,603,473 B1    8/2003    Litke
7,605,820 B1 *  10/2009   Rogers ................... G06T 15/04
                                                            345/419
8,836,701 B1 *  9/2014    Rockwood ............. G06F 17/50
                                                            345/419
2003/0122821 A1  7/2003   Politis
2005/0027445 A1  2/2005   McDonough
2009/0219281 A1 * 9/2009  Maillot ................... G06T 15/04
                                                            345/419
2012/0036542 A1  2/2012   Dotchevski
2015/0187126 A1 * 7/2015  Magder ................... G06T 5/002
                                                            345/426

OTHER PUBLICATIONS

Kraevoy, V., and Sheffer, A. 2004. Cross-parameterization and compatible remeshing of 3D models. ACM Transactions on Graphics 23, 3(Aug.), 861-869.*
Jingqi Yan, Pengfei Shi and David Zhang, Transforming 3D Mesh Surfaces Into Images by Parameterization, vol. 762 of the series The International Series in Engineering and Computer Science pp. 11-30, 2004.*

* cited by examiner

*Primary Examiner* — Jin Ge
(74) *Attorney, Agent, or Firm* — Blank Rome LLP (57) ABSTRACT

Techniques are disclosed for generating and using a conformal or UV mapping between an object's 3D representation (e.g., a polygonal mesh model) and a corresponding 2D representation (e.g., texture memory). More particularly, techniques disclosed herein generate a conformal mapping that allows the rapid identification of disparate locations in texture memory (e.g., those that span a seam) that are spatially similar at the corresponding 3D locations. The ability to perform 2D-to-3D-to-2D mappings quickly, grants the ability to filter across a conformal map's seams—an action that has previously been avoided due to its high computational cost.

21 Claims, 9 Drawing Sheets

UNWRAPPING 3D MESHES INTO LOW-DISTORTION TEXTURE MAPS

BACKGROUND

This disclosure relates generally to the field of image processing. More particularly, but not by way of limitation, this disclosure relates to a technique for converting a three-dimensional (3D) mesh representation of an object into a two-dimensional (2D) representation in a memory efficient manner. This disclosure further describes a novel mechanism by which an operation on a 2D representation of an object can quickly and efficiently be mapped to the object's corresponding 3D representation.

It is known that some types of operations applied directly to a 3D model are difficult to perform. One class of functions this characterization applies to are operations that filter elements across a seam. Here filtering may be taken as any function that relies on pixel values that are to each side of a seam. For example, a blur operation. For this reason, many "3D operations" are actually applied to a 2D image representation (e.g., in memory) of an object's 3D representation; the results are then mapped back onto the 3D model's surface. Conformal or UV mapping is often used to model the correspondence between a point on a 3D surface and a 2D memory location. Conceptually, conformal or UV mapping corresponds to the cutting of a 3D object's surface along seams which allow the (cut) surface to be laid flat (with varying amounts of distortion). One well-known example of this is the Mercator projection of the earth. Conformal mapping techniques are often wasteful of memory and do not lend themselves to cross-seam operations.

SUMMARY

In one embodiment the disclosed concepts provide a method to perform a filter operation across a seam in a conformal map of a three-dimensional (3D) object. The method includes identifying a first location in a memory, the first memory location comprising a first two-dimensional (2D) value (e.g., pixel value) and a first 2D address, wherein the first 2D address corresponds to a first three-dimensional (3D) point, the first 3D point having a first 3D value and corresponding to a first 3D area, wherein the first 3D area represents a first portion of a 3D object's surface. One illustrative 3D area may be a polygonal region on the surface representation of a 3D object.

The method may continue by converting the first 2D address from a first 2D representation to a second 2D representation (e.g., a barycentric conversion); mapping the first 2D address in the second 2D representation to a first 3D address in a first 3D representation (e.g., applying a conformal or UV mapping); converting the first 3D address from the first 3D representation to a second 3D representation (e.g., a barycentric conversion), wherein the first 3D address in the second 3D representation identifies the first 3D point; identifying a second 3D point having a second 3D address in the second 3D representation, wherein the second 3D point is within a specified distance from the first 3D point on the 3D object's surface (e.g., within a blur filter's radius); converting the second 3D address from the second 3D representation to the first 3D representation (e.g., a barycentric conversion); mapping the second 3D address in the first 3D representation to a second 2D address in the second 2D representation (e.g., back through the conformal or UV map); converting the second 2D address in the second 2D representation to the second 2D address in the first 2D representation, wherein the second 2D address in the first 2D representation identifies a second location in the memory, the second memory location having a second 2D value (to here, this process effectively and rapidly identifies a location scattered through texture space with respect to the first memory location); applying an operation to the first and second memory locations (e.g., a blur operation), the operation changing the first and second 2D values; and updating the first and second 3D values based on the changed first and second 2D values, wherein the updating effects a change in the first 3D area representative of the first portion of the 3D object's surface. A computer executable program to implement the method may be stored in any media that is readable and executable by a computer system (e.g., non-transitory memory or storage).

DETAILED DESCRIPTION

This disclosure pertains to systems, methods, and computer readable media to improve the operation of a graphics system. In general, techniques are disclosed for generating and using a conformal or UV mapping between an object's 3D representation (e.g., a polygonal mesh model) and a corresponding 2D representation (e.g., texture memory). More particularly, techniques disclosed herein generate a conformal mapping that allows the rapid identification of disparate locations in texture memory (e.g., those that span a seam) that are spatially similar at the corresponding 3D locations. The ability to perform 2D-to-3D-to-2D mappings quickly, grants the ability to filter across a conformal map's seams—an action that has previously been avoided due to its high computational cost.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of 3D graphical processing systems having the benefit of this disclosure.

Figure 1:
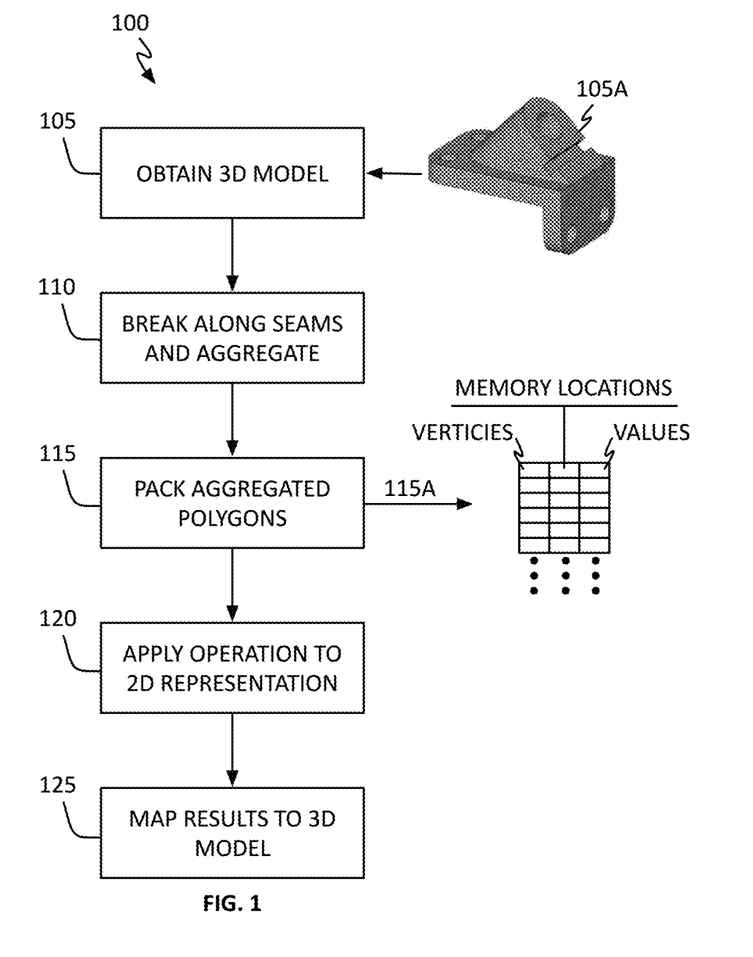
FIG. 1 shows, in flowchart form, a conformal mapping operation in accordance with one embodiment.

Referring to FIG. 1, conformal mapping operation 100 in accordance with one embodiment may begin by obtaining a 3D representation of an object's surface (block 105); for example, polygon mesh 105A. Mesh 105A may be cut along seams and at least some of the polygons comprising mesh 105A aggregated into larger polygons (block 110). By way of example, mesh 105A may be made up of triangles, quadrilaterals or other convex polygons appropriate for the target implementation. Polygons comprising mesh 105A may be aggregated, for example, into rectangles. Once the mesh's polygons have been aggregated, the containers into which they have been aggregated (e.g., rectangles) may be packed into memory as densely as practical to limit memory waste (block 115). At the end of actions in accordance with block 115, mapping 115A has been generated that links every vertex of every polygon in mesh 105A to a 2D coordinate or memory location in a 2D texture, each location having its own value. To apply an operation to an object's 3D model, the desired operation may first be applied to its 2D representation (block 120) and those modifications mapped back onto the 3D object's corresponding mesh 105A (block 125). It should be noted that because of aggregation and packing operations, two points that are next to one another along a seam on mesh 105A are not necessarily next to one another in texture memory. In general, polygons from mesh 105A along seams are scattered throughout texture memory. Because of this, performing an operation on a given point along a seam in mesh 105A (corresponding to a given pixel in texture memory) that requires also modifying adjacent points in mesh 105A requires first determining where in texture memory those points are (as noted, they could be anywhere in texture memory). Only then can the operation be performed. This will be discussed in more detail below during a further description of blocks 120 and 125.

Figure 2:
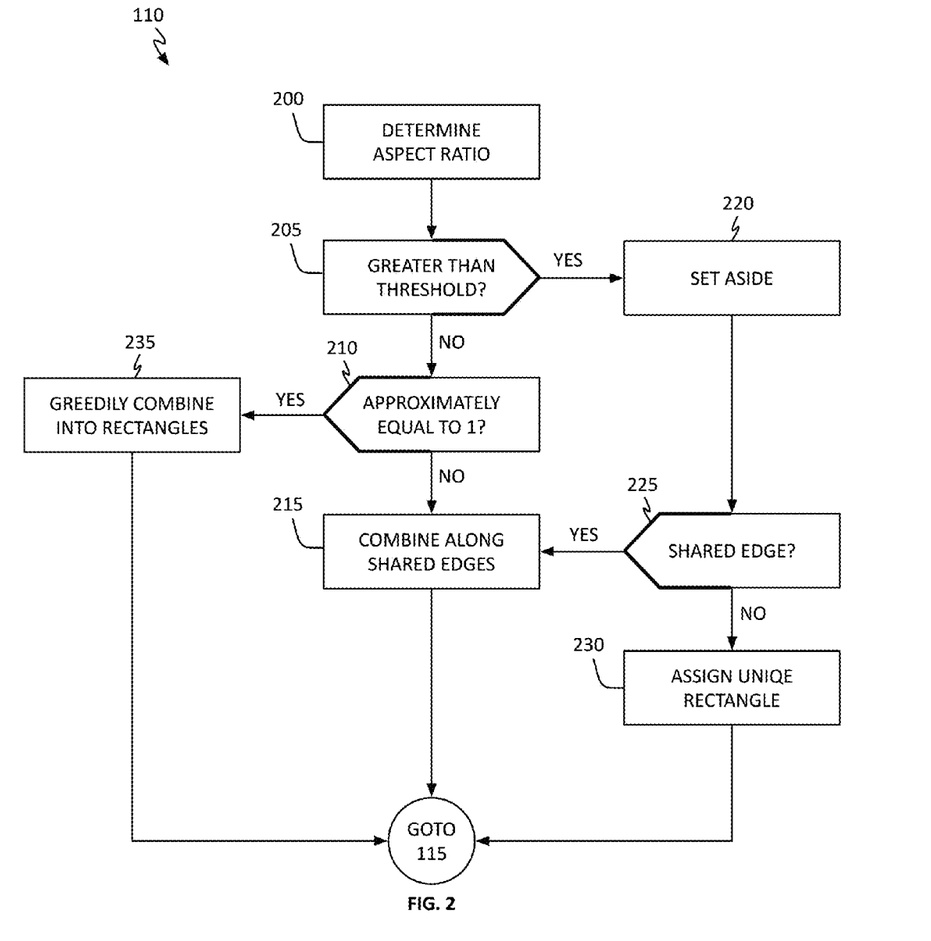
FIG. 2 shows, in flowchart form, an unwrapping operation in accordance with one embodiment.

Referring to FIG. 2, an unwrapping operation in accordance with block 110 may begin by determining the aspect ratio of each polygon in mesh 105A (block 200). For convenience but not limitation, from this point forward polygons making up mesh 105A will be assumed to be triangles. With this established, the aspect ratio may be defined as the length of a triangle's longest edge divided by the length of its shortest edge. While this definition may be particularly relevant to triangles, other metrics may be used for other polygons. For example, One illustrative metric could be the distortion in the relative edge lengths between a 3D edge distance and its corresponding 2D edge distance. If a triangle's aspect ratio is less than or equal to a specified threshold Γ (the "NO" prong of block 205), a further check may be made to determine if the triangle's aspect ratio is approximately equal to 1 (block 210). If it is not (the "NO" prong of block 210), it means the triangle's aspect ratio is less than some specified threshold Γ but not approximately 1. In such cases, unwrapping operation 110 may first proceed to find all triangles that meet this criteria and: (1) share at least one edge, packing them into a common rectangle distorting the individual triangles as little as possible and less than some specified maximum amount; and (2) packing single triangles into their own smallest possible rectangles (block 215). It should be understood that what constitutes "approximately 1" and a "specified maximum amount" of distortion may vary from implementation to implementation. The precise values of these parameters may be adjusted by the designer to help meet their system performance criteria. In general, it has been found that trial-and-error may be used. It is further noted that the choice of a rectangle as the packing container is also a design choice. Rectangles may be particularly good choice however as they lend themselves most easily to mapping onto memory, itself arranged into a rectangular grid of locations (see discussion below). Further, all known current packing algorithms expect rectangles; not accepting other polygonal shapes.

If a triangle's aspect ratio is greater than some threshold Γ (the "YES" prong of block 205), they may be temporarily set aside (block 220). Triangles satisfying the condition for block 220 may be considered "slivers." That is, so thin that it can be difficult to determine which direction their surfaces face. Later, if any of the identified "slivers" share an edge with a non-sliver triangle (the "YES" prong of block 225), they may be incorporated into that triangle's rectangle which, in effect, gives the sliver the same value as the non-sliver triangle (block 215). Here, the "same value" means the same texture coordinates, which (as a texture is memory) means the same memory address, which means that the actual value contained in the texture is the same. If any of the identified "slivers" fail to share an edge with a non-sliver triangle (the "NO" prong of block 225), they may each be packed into their own smallest possible rectangle. If a triangle's aspect ratio is approximately 1 (the "YES" prong of block 210), unwrapping operation 110 aggregates all such triangles that are next to one another in mesh 105A placing them into a common rectangle (block 235). Side-by-side triangles whose aspect ratios are approximately 1 may be placed into, and completely or nearly completely fill, a square—a particularly good shape when packing aggregated rectangles into memory in accordance with block 115. The effect of actions in accordance with block 235 is to ensure that all triangles that are next to one another in the 2D texture map (aka memory) are also next to one another in 3D mesh 105A (as noted above, the converse is not necessarily true).

Figure 3:
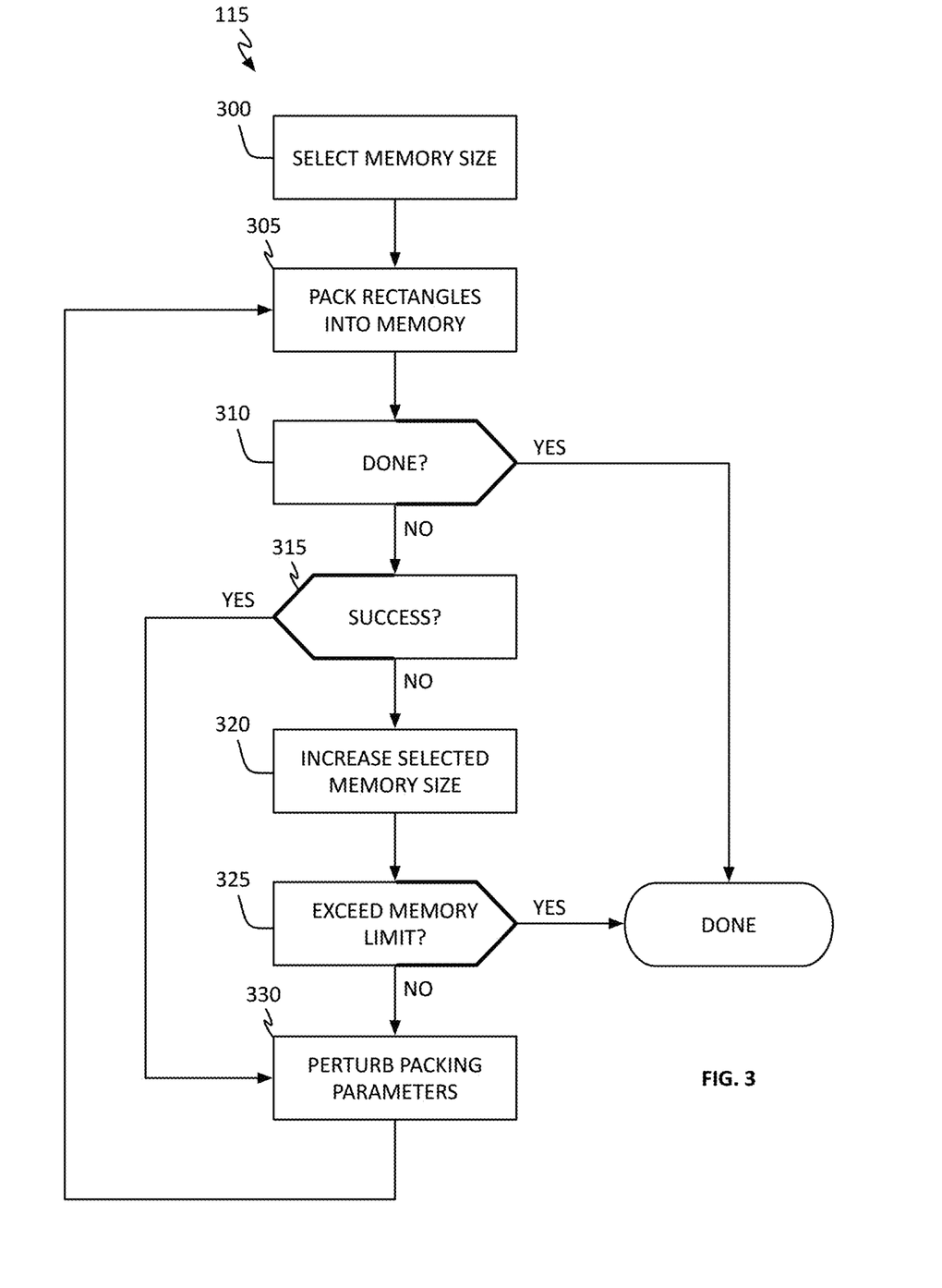
FIG. 3 shows, in flowchart form, a packing operation in accordance with one embodiment.

One goal of packing operations in accordance with block 115 is to place objects (i.e., rectangles) of different volumes (i.e., sizes) into a finite number of bins (i.e., memory) in a way that minimizes the number of bins used (i.e., memory). Referring now to FIG. 3, packing operation 115 in accordance with one embodiment may begin by selecting or allocating a first quantum of memory (block 300). In one embodiment, an initial memory size may be a specified function of the number of polygons in mesh 105A such as the square-root or a constant multiplier such as 0.3. The various sized rectangles identified during unwrapping operation 110 may then be packed or arranged into the allocated memory as densely as possible using any desired algorithm and/or collection of heuristics (block 305). In one embodiment, a bounding box-tree algorithm may be used. In another embodiment, a space colonization algorithm may be used. In yet other embodiments, first-fit or MCC block classification algorithms may be used. In still another embodiment a combination of one or more of these approaches may be employed. Since a dense packing correlates to high memory utilization, it is a goal of block 305 to use as much of the allocated memory as possible, but not more. In one embodiment, at the conclusion of packing actions in accordance with block 305 a test may be made to determine whether additional packing cycles need to, or should, be made (block 310). By way of example, packing cycles exemplified by blocks 305-330 may be repeated until some specified criteria is met. This criteria may, for example, be a small specified number of cycles (e.g., 4 to 10). In another embodiment the criteria may be obtaining a specified memory packing efficiency one or more times (e.g., 75% to 90%). In yet another embodiment, the criteria may be meeting a specified memory packing efficiency in 'm' out of 'n' cycles. In still another embodiment, the criteria may be the obtained packing efficiency changing less than a specified amount from one cycle to another (e.g., 1%). In other embodiments a metric other than, or in addition to, packing efficiency may be used to establish a termination criteria. In one embodiment, for example, a termination criteria could be that all packing is done with at least X efficiency and all triangles have a distortion of under Y distortion. If the selected criteria is met (the "YES" prong of block 310), packing operation in accordance with 115 may terminate. If the selected criteria is not met (the "NO" prong of block 310), a further test may be made to determine whether the current packing cycle successfully packed the given rectangles into the allocated memory (block 115). If the current packing cycle failed because of insufficient memory (the "NO" prong of block 315), the allocated memory may be increased by some factor (block 320). In one embodiment the allocated memory may be increased by a function of the total number of triangles in mesh 105A (e.g. 1.5). In another embodiment, the allocated memory may be increased by a fixed factor (e.g., 2). Thereafter another check may be made to determine if the specified memory size exceeds a specified maximum (block 325). In one embodiment, if the selected amount of memory exceeds a predetermined threshold (the "YES" prong of block 125), packing operation 115 may terminate. In another embodiment if increasing the amount of memory available to packing operation 115 was exceeded by actions in accordance with block 320, but another termination criteria has not been met (e.g., a number of packing cycles), the allocated memory may be reset to the maximum memory amount where after operations continue at block 330. If the selected memory does not exceed a predetermined threshold (the "NO" prong of block 125), packing algorithm parameters may be changed in accordance with a specified mechanism (block 330) and the next packing cycle begun at block 305. Packing parameters available for modification in accordance with block 330 may depend upon the packing algorithm being used at block 305. In one embodiment a genetic algorithm may be used to perturb the packing parameters. In those embodiments that perform more than one successful packing cycle in accordance with blocks 305-330, the most efficient packing arrangement may be selected on termination. As used here, memory efficiency may be defined as the ratio of the number of pixels containing data in the texture (i.e., within a triangle) divided by the complete or total number of pixels in the texture (e.g., texture width multiplied by texture height)

At the successful termination of packing operation 115, all of mesh 105A's triangles have been assigned to a rectangle and all of those rectangles have been placed into texture memory. Said differently, every 3D vertex in mesh 105A has been mapped to a corresponding 2D vertex in texture memory. As such, when operating on a single point in 2D space the resulting value may easily be mapped to the corresponding 3D point. Many prior conformal mappings permit this. When an operation on a 2D location or pixel along a seam requires that 3D points that are near (in 3D space) the pixel's corresponding 3D location however, the task becomes much more difficult. Because of seams and the resulting polygon aggregation and packing operations, pixels next to one another in texture memory are not necessarily next to one another in 3D space. Accordingly, operations that apply to multiple 3D points near a corresponding given 2D pixel along a seam cannot simply be applied to pixels near that given pixel in texture memory. Graphical functions that exhibit this sort of behavior include filter operations in general, and blur operations in particular.

Figure 4A:
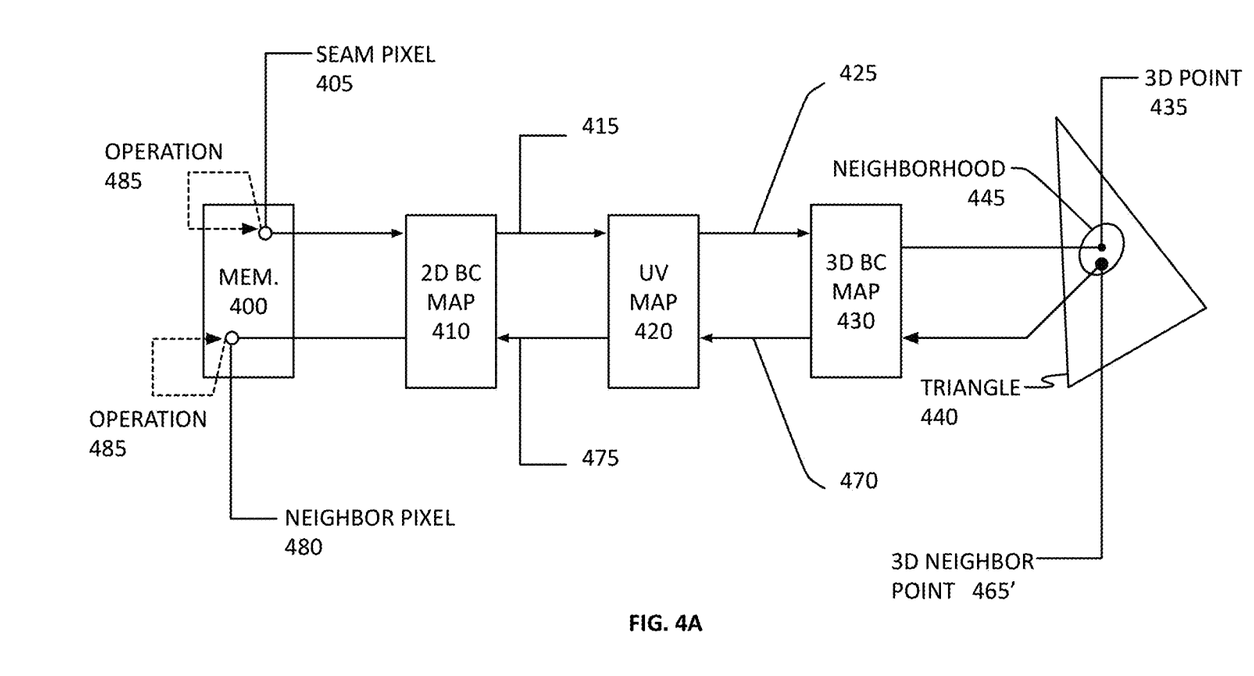
FIGS. 4A-4C illustrate a methodology to quickly identify and blur seam pixels in accordance with one embodiment.

Operations in accordance with blocks 120 and 125 may be most easily understood in the context of a use case as shown in FIG. 4. Referring first to FIG. 4A, consider for example a blur operation around a seam pixel stored in texture memory 400 at address 405. Since we know the seam pixel at address 405 is in a triangle in 3D mesh 105A, 2D barycentric converter 410 may be used to obtain 2D barycentric-based address 415. This address in turn may be applied to UV map 420 (created during actions in accordance with block 115) to identify 3D address 425. As in 2D space, 3D barycentric converter 430 may be used to identify point 435 in triangle 440 (in mesh 105A) corresponding to the seam pixel stored in memory 400 at address 405. The symmetrical use of barycentric conversions relies on the fact that barycentric conversions operate the same in 2D and 3D. This feature is exploited here to enable the rapid conversion between 2D memory addresses and corresponding 3D points in mesh 105A. (It should be noted that while converters 410 and 430 have been referred to as '2D' and '3D' converters, barycentric conversion is the same in both cases. The '2D' and '3D' notation has been selected for convenience.)

Figure 4B:
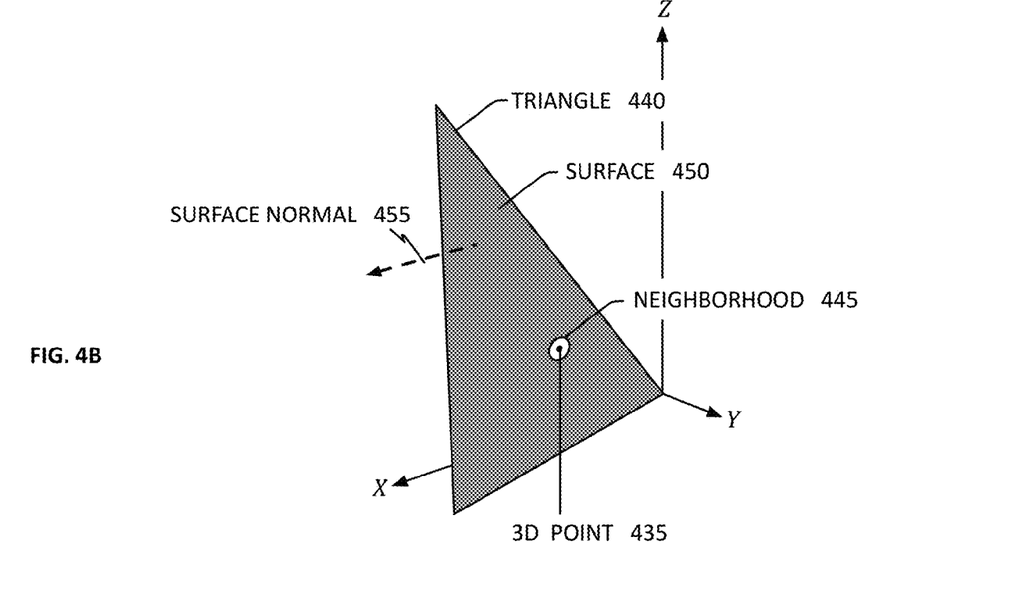
Figure 4C:
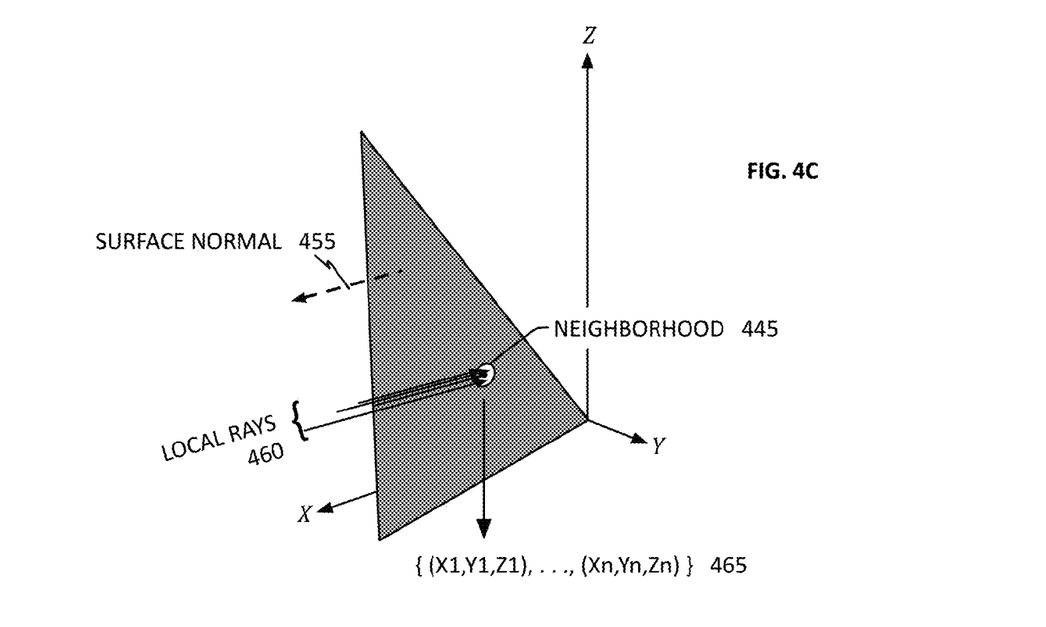
Figure 5A:
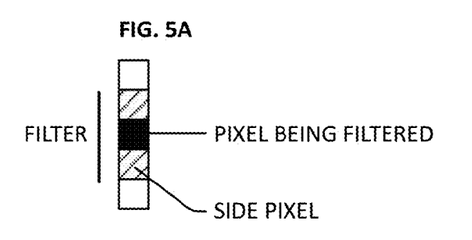
FIGS. 5A-5E illustrate the exigencies, of adapting to use of a hardware filter in accordance with one embodiment.
Figure 5B:
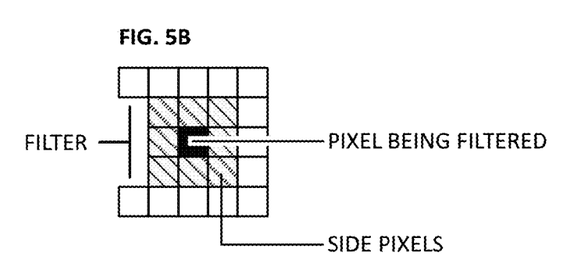
Figure 5C:
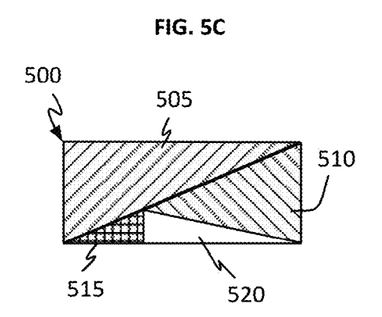
Figure 5D:
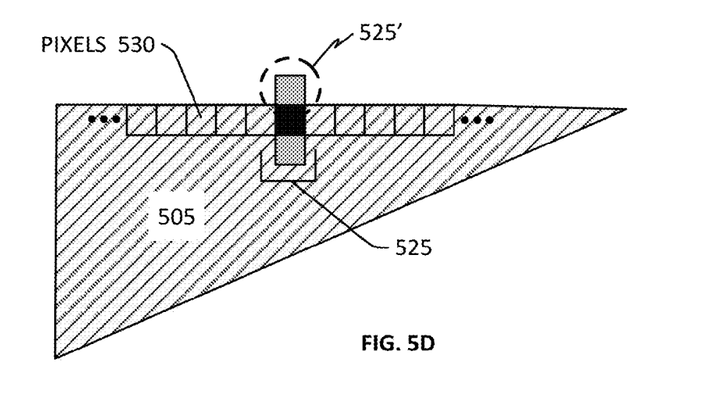
Figure 5E:
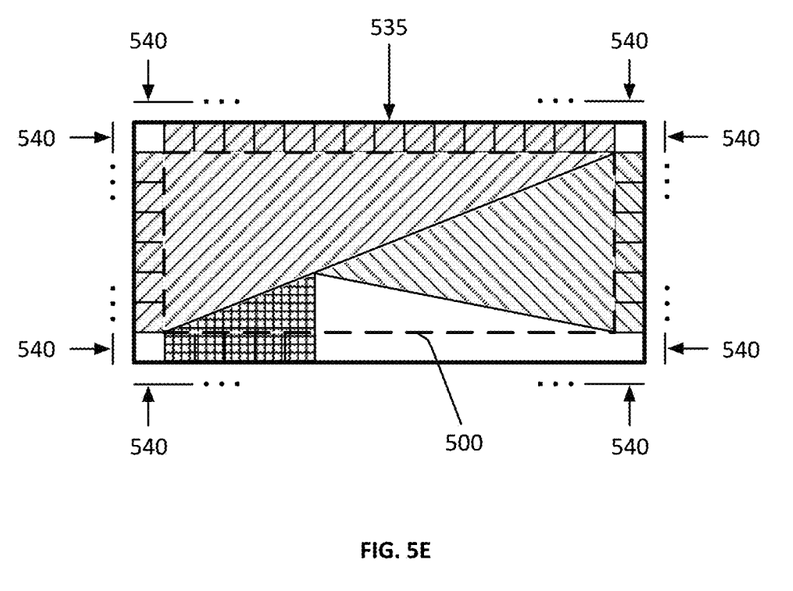

To effect the desired blur operation about 3D point 435, 3D points in neighborhood 445 corresponding to pixels in texture memory 400 need to be identified. In one embodiment, the size and shape of neighborhood 445 may be specified by the particular blur operation (e.g., its diameter). Referring now to FIG. 4B, there is shown triangle 440 (corresponding to the pixel at location 405) with its surface 450 and surface normal direction 455. Referring now to FIG. 4C, to identify 3D points in neighborhood 445 of 3D point 435, rays 460 may be traced towards the 3D mesh (i.e., surface 450 of triangle 440). Rays 460 should be within neighborhood 445 and collinear to the triangle's surface normal 455. The rays should be collinear to surface normal 455 to ensure the ray-traced points 465 are actually within neighborhood 445. In one embodiment, the number of rays needed may be a function of the size of neighborhood 445 (e.g., the width of the blur). Each 3D point from the set of identified 3D points 465 may be identified by an x, y, z triplet.

Returning again to FIG. 4A, for convenience let 3D neighbor point 465' represent one of the 3D points identified in set 465 in FIG. 4C. Barycentric converter 430 may be used to obtain 3D barycentric-based address 470. This address in turn may be applied to UV map 420 to identify 2D address 475. As in 3D space, 2D barycentric converter 410 may be used to identify that pixel in memory 400 that corresponds to neighbor point 465'—neighbor pixel stored at location 480. With all of 3D neighbor points 465 similarly processed, the desired blur operation 485 may be performed on each corresponding neighbor pixel. The new values generated by operation 485 may be directly applied to triangle 440 (on mesh 105A) as the appropriate 3D addresses are already known. In summary, seam pixels scattered throughout texture memory by the conformal mapping process may be quickly identified through a series of barycentric conversions and a limited number of ray-tracing operations. The low computational complexity of these operations permits, for the first time, application and use of cross-seam filtering operations.

Referring to FIG. 5, in one embodiment hardware may be used to filter pixels in texture memory. Illustrative hardware filters include a 3-pixel tent filter (FIG. 5A) and a 9 pixel Gaussian filter (FIG. 5B). Referring to FIG. 5C illustrative rectangle has packed therein triangles 505, 510 and 515 and empty space 520. Consider now a situation such as that shown in FIG. 5D. There, when hardware filter 525 is applied to pixels 530 along the edge of triangle 505, values 525' outside rectangle are needed. When a hardware filter is used there is generally no way to simulate "missing values" such as 525'. For this reason, in one embodiment each rectangle identified during unwrap operation 110 may be expanded by an amount needed to accommodate the hardware filter when applied to the rectangle's outermost triangles (i.e., those triangles forming an edge of rectangle 500). By way of example and as shown in FIG. 5E, original rectangle 500 has been expanded to new rectangle 535 by an amount 540 to accommodate a hardware filter. Once expanded to accommodate a hardware filter, all of the expanded rectangles may be submitted to packing operation 115. It should be noted that while the filters identified in FIG. 5 were symmetrical, no such limitation should be applied to the disclosed technology.

Figure 6:
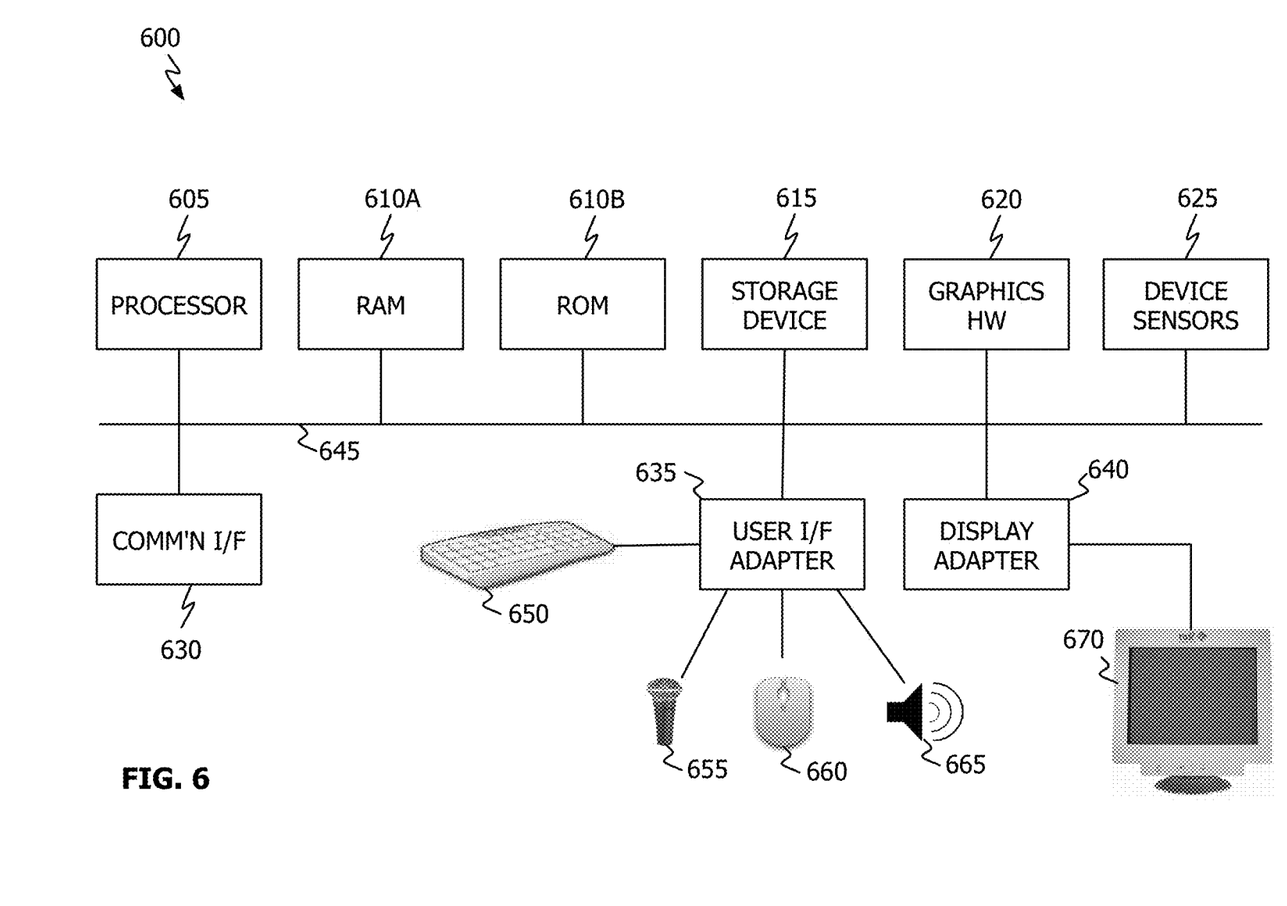
FIG. 6 shows, in block diagram form, a computer system in accordance with one embodiment.

Referring to FIG. 6, the disclosed conformal mapping and cross-seam filtering operations may be performed by representative computer system 600 (e.g., a general purpose computer system such as a desktop, laptop, notebook or tablet computer system). Computer system 600 may include one or more processors 605, memory 610 (610A and 610B), one or more storage devices 615, graphics hardware 620, device sensors 625 (e.g., 3D depth sensor, proximity sensor, ambient light sensor, accelerometer and/or gyroscope), communication interface 630, user interface adapter 635 and display adapter 640—all of which may be coupled via system bus or backplane 645 which may be comprised of one or more continuous (as shown) or discontinuous communication links. Memory 610 may include one or more different types of media (typically solid-state) used by processor 605 and graphics hardware 620. For example, memory 610 may include memory cache, read-only memory (ROM), and/or random access memory (RAM). Storage 615 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 610 and storage 615 may be used to retain media (e.g., audio, image and video files), preference information, device profile information, computer program instructions or code organized into one or more modules and written in any desired computer programming language, and any other suitable data. When executed by processor(s) 605 and/or graphics hardware 620 such computer program code may implement one or more of the methods described herein. Communication interface 630 may be used to connect computer system 600 to one or more networks. Illustrative networks include, but are not limited to, a local network such as a USB network, an organization's local area network, and a wide area network such as the Internet. Communication interface 630 may use any suitable technology (e.g., wired or wireless) and protocol (e.g., Transmission Control Protocol (TCP), Internet Protocol (IP), User Datagram Protocol (UDP), Internet Control Message Protocol (ICMP), Hypertext Transfer Protocol (HTTP), Post Office Protocol (POP), File Transfer Protocol (FTP), and Internet Message Access Protocol (IMAP)). User interface adapter 635 may be used to connect keyboard 650, microphone 655, pointer device 660, speaker 665 and other user interface devices such as a touch-pad and/or a touch screen (not shown). Display adapter 640 may be used to connect one or more display units 670 which may provide touch input capability. Processor 605 may be a system-on-chip such as those found in mobile devices and include one or more dedicated graphics processing units (GPUs). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 perform computational tasks. In one embodiment, graphics hardware 620 may include one or more programmable GPUs and each such unit may include one or more processing cores.

Figure 7:
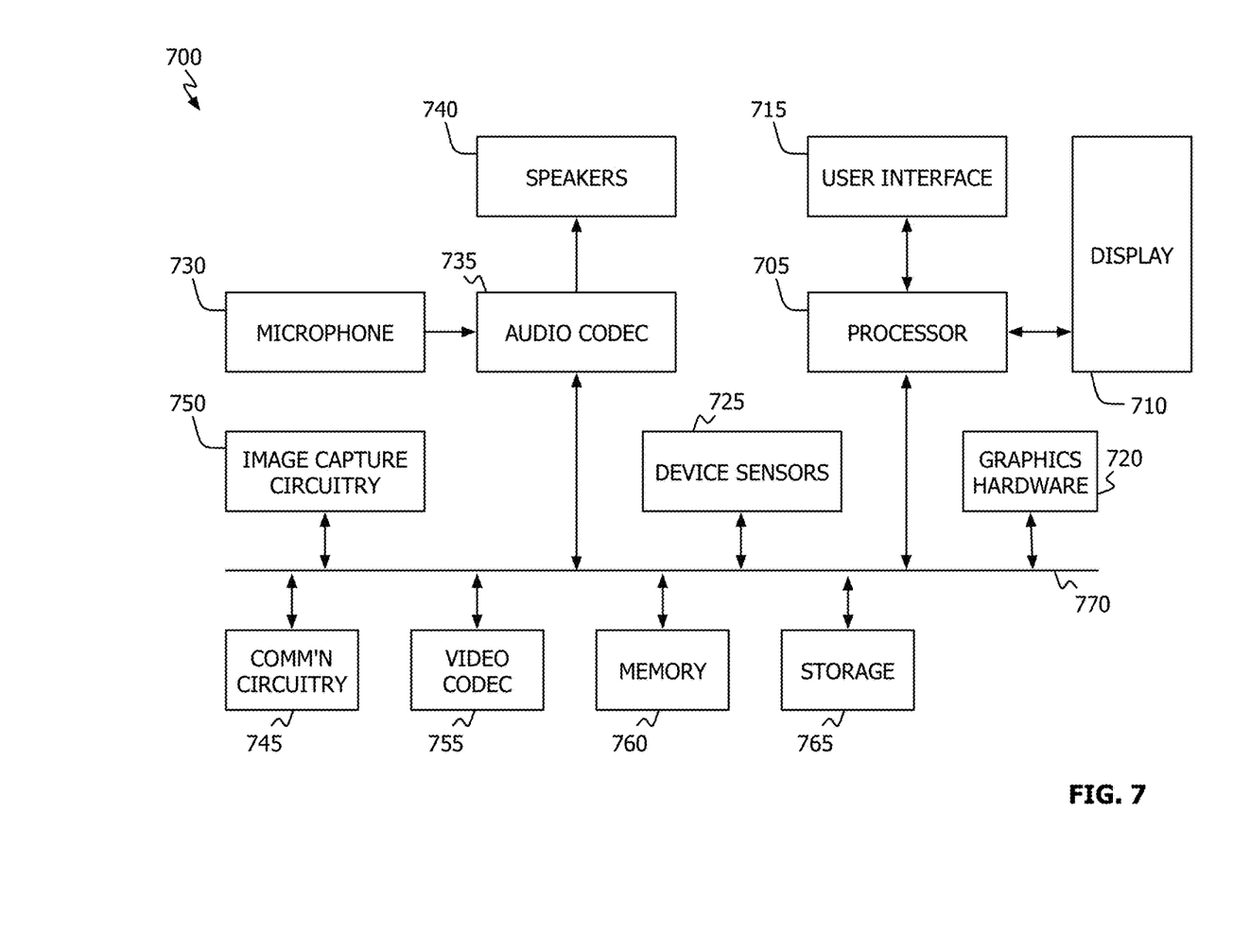
FIG. 7 shows, in block diagram form, a multi-function electronic device in accordance with one embodiment.

Referring to FIG. 7, a simplified functional block diagram of illustrative mobile electronic device 700 is shown according to one embodiment. Electronic device 700 could be, for example, a mobile telephone, personal media device, a notebook computer system, or a tablet computer system. As shown, electronic device 700 may include processor 705, display 710, user interface 715, graphics hardware 720, device sensors 725 (e.g., proximity sensor/ambient light sensor, accelerometer and/or gyroscope), microphone 730, audio codec(s) 735, speaker(s) 740, communications circuitry 745, image capture circuit or unit 750, video codec(s) 755, memory 760, storage 765, and communications bus 770.

Processor 705, display 710, user interface 715, graphics hardware 720, device sensors 725, communications circuitry 745, memory 760 and storage 765 may be of the same or similar type and serve the same function as the similarly named component described above with respect to FIG. 6. Audio signals obtained via microphone 730 may be, at least partially, processed by audio codec(s) 735. Data so captured may be stored in memory 760 and/or storage 765 and/or output through speakers 740. Image capture circuitry 750 may capture still and video images. Output from image capture circuitry 750 may be processed, at least in part, by video codec(s) 755 and/or processor 705 and/or graphics hardware 720, and/or a dedicated image processing unit incorporated within circuitry 750. Images so captured may be stored in memory 760 and/or storage 765.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). For example, the disclosed conformal mapping operations may use, or not, the embodiments illustrated in FIGS. 5A-5E. Further, FIGS. 1-3 show flowcharts illustrating basic conformal mapping and use operations in accordance with the disclosed embodiments. In one or more embodiments, one or more of the disclosed steps may be omitted, repeated, and/or performed in a different order than that described herein. Accordingly, the specific arrangement of steps or actions shown in FIG. 3 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A computer-implemented method for processing a three-dimensional (3D) representation of an object which includes identification of disparate locations in memory that correspond to spatially similar locations in the object's 3D representation, the method comprising:
   identifying a first location in a memory, the first memory location comprising a first two-dimensional (2D) value and a first 2D address, wherein the first 2D address corresponds to a first three-dimensional (3D) point, the first 3D point having a first 3D value and corresponding to a first 3D area, wherein the first 3D area represents a portion of a 3D object's surface;
   converting the first 2D address from a first 2D representation to a second 2D representation;
   mapping the first 2D address in the second 2D representation to a first 3D address in a first 3D representation;
   converting the first 3D address from the first 3D representation to a second 3D representation, wherein the first 3D address in the second 3D representation identifies the first 3D point;
   identifying a second 3D point having a second 3D value and a second 3D address in the second 3D representation, the identification of the second 3D point comprising tracing a ray towards the 3D object's surface, wherein the ray is collinear to a normal of the 3D object's surface, and wherein each of the ray and the second 3D point is within a specified distance from the first 3D point on the 3D object's surface;
   converting the second 3D address from the second 3D representation to the first 3D representation;
   mapping the second 3D address in the first 3D representation to a second 2D address in the second 2D representation;
   converting the second 2D address from the second 2D representation to the first 2D representation, wherein the second 2D address in the first 2D representation identifies a second location in the memory, the second memory location having a second 2D value;
   applying an operation to the first and second memory locations, the operation changing the first and second 2D values; and
   updating the first and second 3D values based on the changed first and second 2D values, wherein the updating effects a change in the first 3D area representative of the portion of the 3D object's surface.

2. The method of claim 1, wherein one or more of the first and second memory locations correspond to a seam pixel in a conformal map of the 3D object's surface.

3. The method of claim 1, wherein converting the first 2D address comprises applying a barycentric conversion to the first 2D address in the first 2D representation.

4. The method of claim 3, wherein converting the second 3D address comprises applying another barycentric conversion to the second 3D address in the second 3D representation.

5. The method of claim 1, wherein mapping the first 2D address comprises applying the first 2D address to a UV conformal map.

6. The method of claim 5, wherein mapping the second 3D address comprises applying the second 3D address to the UV conformal map.

7. The method of claim 6, wherein the UV conformal map is constructed using surface containers expanded to account for hardware filtering.

8. A non-transitory program storage device on which instructions are stored, the stored instructions comprising instructions for processing a three-dimensional (3D) representation of an object which includes identification of disparate locations in memory that correspond to spatially similar locations in the object's 3D representation, which when executed by one or more processors cause the one or more processors to:
   identify a first location in a memory, the first memory location comprising a first two-dimensional (2D) value and a first 2D address, wherein the first 2D address corresponds to a first three-dimensional (3D) point, the first 3D point having a first 3D value and corresponding to a first 3D area, wherein the first 3D area represents a first portion of a 3D object's surface;
   convert the first 2D address from a first 2D representation to a second 2D representation;
   map the first 2D address in the second 2D representation to a first 3D address in a first 3D representation;
   convert the first 3D address from the first 3D representation to a second 3D representation, wherein the first 3D address in the second 3D representation identifies the first 3D point;
   identify a second 3D point having a second 3D value and a second 3D address in the second 3D representation, wherein the instructions for causing the one or more processors to identify the second 3D point comprise instructions for causing the one or more processors to trace a ray towards the 3D object's surface, wherein the ray is collinear to a normal of the 3D object's surface, and wherein each of the ray and the second 3D point is within a specified distance from the first 3D point on the 3D object's surface;
   convert the second 3D address from the second 3D representation to the first 3D representation;
   map the second 3D address in the first 3D representation to a second 2D address in the second 2D representation;
   convert the second 2D address from the second 2D representation to the first 2D representation, wherein the second 2D address in the first 2D representation identifies a second location in the memory, the second memory location having a second 2D value;
   apply an operation to the first and second memory locations, the operation changing the first and second 2D values; and
   update the first and second 3D values based on the changed first and second 2D values, wherein the updating effects a change in the first 3D area representative of the portion of the 3D object's surface.

9. The non-transitory program storage device of claim 8, wherein or more of the first and second memory locations correspond to a seam pixel in a conformal map of the 3D object's surface.

10. The non-transitory program storage device of claim 8, wherein the instructions to convert the first 2D address comprise instructions to apply a barycentric conversion to the first 2D address in the first 2D representation.

11. The non-transitory program storage device of claim 10, wherein the instructions to convert the second 3D address comprise instructions to apply another barycentric conversion to the second 3D address in the second 3D representation.

12. The non-transitory program storage device of claim 8, wherein the instructions to map the first 2D address comprise instructions to apply the first 2D address to a UV conformal map.

13. The non-transitory program storage device of claim 12, wherein the instructions to map the second 3D address comprise instructions to apply the second 3D address to the UV conformal map.

14. The non-transitory program storage device of claim 13, wherein the UV conformal map is constructed using surface containers expanded to account for hardware filtering.

15. A computer system configured to process a three-dimensional (3D) representation of an object which includes identification of disparate locations in the memory that correspond to spatially similar locations in the object's 3D representation, the computer system comprising:
   memory configured to store data, the stored data comprising program instructions,
   a display coupled to the memory,
   one or more processors coupled to the memory and the display, the one or processors being configured to execute the program instructions to:
   identify a first location in the memory, the first memory location comprising a first two-dimensional (2D) value and a first 2D address, wherein the first 2D address corresponds to a first three-dimensional (3D) point, the first 3D point having a first 3D value and corresponding to a first 3D area, wherein the first 3D area represents a portion of a 3D object's surface,
   convert the first 2D address from a first 2D representation to a second 2D representation,
   map the first 2D address in the second 2D representation to a first 3D address in a first 3D representation,
   convert the first 3D address from the first 3D representation to a second 3D representation, wherein the first 3D address in the second 3D representation identifies the first 3D point,
   identify a second 3D point having a second 3D value and a second 3D address in the second 3D representation, wherein the program instructions for causing the one or more processors to identify the second 3D point comprise program instructions for causing the one or more processors to trace a ray towards the 3D object's surface, wherein the ray is collinear to a normal of the 3D object's surface, and wherein each of the ray and the second 3D point is within a specified distance from the first 3D point on the 3D object's surface,
   convert the second 3D address from the second 3D representation to the first 3D representation,
   map the second 3D address in the first 3D representation to a second 2D address in the second 2D representation,
   convert the second 2D address from the second 2D representation to the first 2D representation, wherein the second 2D address in the first 2D representation identifies a second location in the memory, the second memory location having a second 2D value,
   apply an operation to the first and second memory locations, the operation changing the first and second 2D values,
   update the first and second 3D values based on the changed first and second 2D values, wherein the updating effects a change in the first 3D area representative of the first portion of the 3D object's surface, and
   update the display to show the updated first and second 3D values.

16. The computer system of claim 15, wherein one or more of the first and second memory locations correspond to a seam pixel in a conformal map of the 3D object's surface.

17. The computer system of claim 15, wherein the program instructions to cause the one or more processors to convert the first 2D address comprise instructions to cause the one or more processors to apply a barycentric conversion to the first 2D address in the first 2D representation.

18. The computer system of claim 17, wherein the program instructions to cause the one or more processors to convert the second 3D address comprise instructions to cause the one or more processors to apply another barycentric conversion to the second 3D address in the second 3D representation.

19. The computer system of claim 15, wherein the program instructions to cause the one or more processors to map the first 2D address comprise program instructions to cause the one or more processors to apply the first 2D address to a UV conformal map.

20. The computer system of claim 19, wherein the program instructions to cause the one or more processors to map the second 3D address comprise program instructions to cause the one or more processors to apply the second 3D address to the UV conformal map.

21. The computer system of claim 20, wherein the UV conformal map is constructed using surface containers expanded to account for hardware filtering.

* * * * *